(12) United States Patent
Nguyen et al.

(10) Patent No.: US 7,373,413 B1
(45) Date of Patent: May 13, 2008

(54) DEVICES AND METHODS FOR MINIMIZING START UP DELAY IN TRANSMISSION OF STREAMING MEDIA

(75) Inventors: Bich Nguyen, Los Altos, CA (US); Ilya Slain, Santa Clara, CA (US); Kevin J. Connor, Sunnyvale, CA (US); Luke K. Surazski, San Jose, CA (US); Ramanathan T. Jagadeesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1021 days.

(21) Appl. No.: 09/606,790

(22) Filed: Jun. 28, 2000

(51) Int. Cl.
*G06F 15/16* (2006.01)

(52) U.S. Cl. .................. 709/231; 709/203; 709/217; 709/230; 725/4.1; 725/90; 725/98; 370/231

(58) Field of Classification Search ............... 709/231, 709/217–19, 246, 230, 203, 218, 219; 725/94, 725/41, 43, 90, 96, 98; 370/231, 232
See application file for complete search history.

(56) References Cited

U.S. PATENT DOCUMENTS

| | | | | |
|---|---|---|---|---|
| 5,534,937 A * | 7/1996 | Zhu et al. | ............... | 375/240.27 |
| 5,640,388 A * | 6/1997 | Woodhead et al. | ......... | 370/516 |
| 5,805,602 A * | 9/1998 | Cloutier et al. | ............. | 370/516 |
| 5,918,020 A * | 6/1999 | Blackard et al. | ............. | 709/228 |
| 5,928,330 A * | 7/1999 | Goetz et al. | ................ | 709/231 |
| 5,996,018 A * | 11/1999 | Duault et al. | ................ | 709/234 |
| 6,058,109 A * | 5/2000 | Lechleider | .................. | 370/352 |
| 6,175,871 B1 * | 1/2001 | Schuster et al. | ............. | 709/231 |
| 6,212,206 B1 * | 4/2001 | Ketcham | ..................... | 370/516 |
| 6,259,677 B1 * | 7/2001 | Jain | ............................ | 370/252 |
| 6,292,834 B1 * | 9/2001 | Ravi et al. | ................... | 709/233 |
| 6,360,271 B1 * | 3/2002 | Schuster et al. | ............. | 709/231 |
| 6,434,606 B1 * | 8/2002 | Borella et al. | .............. | 709/214 |
| 6,452,950 B1 * | 9/2002 | Ohlsson et al. | ............. | 370/516 |
| 6,484,212 B1 * | 11/2002 | Markowitz et al. | ......... | 709/246 |
| 6,490,250 B1 * | 12/2002 | Hinchley et al. | ........... | 370/232 |
| 6,496,868 B2 * | 12/2002 | Krueger et al. | ............. | 709/247 |
| 6,542,546 B1 * | 4/2003 | Vetro et al. | ............ | 375/240.12 |
| 6,637,031 B1 * | 10/2003 | Chou | .......................... | 725/87 |
| 6,658,027 B1 * | 12/2003 | Kramer et al. | .............. | 370/516 |

(Continued)

*Primary Examiner*—LaShonda T Jacobs
(74) *Attorney, Agent, or Firm*—Marger Johnson & McCollom, P.C.

(57) ABSTRACT

Devices and methods are provided for minimizing the startup delay of streaming media transmitted through networks. A server maintains a portion of the media stream stored in an initial burst transmit buffer. At startup, the stored portion is transmitted at a rate higher than the fixed frame rate, exploiting the full available bandwidth. The initial burst transmission fills up the de-jitter receive buffer at the receiving end faster, thereby shortening the startup delay. Then transmission is switched to the regular rate, from the regular buffer. A variable bit rate transcoder is optionally used for the data of the initial transmission. The transcoder diminishes the size of these frames, so they can be transmitted faster. This shortens the start up delay even more. A receiver has a buffer with a fill level started at a value lower than a final value. This triggers the beginning of play out faster, further shortening the delay time. The fill level of the de-jitter receive buffer is then gradually increased to a desired final value.

19 Claims, 6 Drawing Sheets

U.S. PATENT DOCUMENTS

| | | | |
|---|---|---|---|
| 6,704,281 B1* | 3/2004 | Hourunranta et al. | 370/230 |
| 6,977,942 B2* | 12/2005 | Raisanen | 370/429 |
| 7,079,486 B2* | 7/2006 | Colavito et al. | 370/231 |
| 7,225,459 B2* | 5/2007 | Magliaro | 725/98 |
| 2001/0055276 A1* | 12/2001 | Rogers et al. | 370/232 |
| 2003/0198184 A1* | 10/2003 | Huang et al. | 370/231 |

* cited by examiner

DEVICES AND METHODS FOR MINIMIZING START UP DELAY IN TRANSMISSION OF STREAMING MEDIA

BACKGROUND OF THE INVENTION

1. Field of the Invention

The present invention is related to the field of data transmission over networks, and more specifically to devices and methods for minimizing the startup delay of streaming media.

2. Description of the Related Art

Networks are increasingly used to transmit data. The data can be for various media, such as audio or video, and is usually organized in groups that are called frames. When such data is transmitted continuously, it is also called streaming media. The transmission can either be for live, or for canned media. Either way, the transmission has to be in real-time, or in delayed real-time.

A fundamental requirement for streaming media is that it has to be played at a constant rate. Packet networks, however, may transmit data asynchronously. Therefore, for streaming media to be transmitted over packet networks, strict timing requirements have to be met in order to achieve high-quality media play out. Furthermore, where there are two related but separate streams of media (such as audio and video), they have to be time-synchronized.

The bandwidth of the channel is intended to be wider than what is required by the streaming media. The channel bandwidth, however, is occasionally subject to congestion. This causes play out of streaming media to exhibit the problem of network jitter, if played out in real-time. This means that what is played out might be momentarily discontinued, if the bandwidth of the network is momentarily constricted to less than the required bandwidth of the streaming media.

Referring to FIG. 1, the problem of network jitter has been solved in the art by introducing a de-jitter buffer at the receiving end. A server or proxy 110 transmits data to a client or receiver 160 through a network 150. The server 110 includes a path 112 for data received from a source, and transmitted to the network 150. Typically, the server 110 includes a buffer in the path 112, such as a transmit buffer 114.

Importantly, the client 160 includes a fixed size de-jitter receive buffer 162. The buffer 162 first fills up to its size, and then starts playing out. While playing out, the buffer 162 is emptied at the same rate as it is filled. Constrictions in bandwidth affect only the fullness of the buffer, not the play out, therefore preventing network jitter. The larger the size of the buffer, the more the network jitter phenomenon is abated.

A problem generated by the de-jitter receive buffer 162 is a phenomenon called startup delay. The phenomenon is now described in more detail below.

Referring to FIG. 2, the fullness of the buffer 162 is plotted against a time axis as a line 210. Initially the buffer 162 fills up to its size fy, which it reaches at time point 212. For illustration purposes, the line 210 is shown in an approximate manner as a ramp. However, the line is actually piecewise linear, shaped more like a stair.

After reaching its full size fy, playout begins. Then the buffer 162 ideally remains at the same fullness level. Again, that is shown as a straight line only for illustration purposes. The fullness level buffer 162 may temporarily go lower than the ideal.

It will be appreciated that the larger the size fy is, the longer time it takes to reach that level. The time between zero and time point 212 is called the startup delay. The startup delay causes the play out to be in delayed real-time, compared to when the data is received.

The startup delay can be as long as one second or more, which is a problem. It is even more of a problem when the user is channel surfing, i.e. switching quickly from one channel to another. With every new channel switch, there is another startup delay.

BRIEF SUMMARY OF THE INVENTION

The present invention overcomes the problems and limitations of the prior art.

Generally, the present invention provides devices and methods that diminish the startup delay of streaming media.

In one embodiment, the invention maintains a portion of the media stream stored in an initial burst transmit buffer of the server. At startup, the stored portion is transmitted at a rate higher than the fixed frame rate. This exploits the additional, unused bandwidth of the network. This initial transmission fills up the de-jitter receive buffer at the receiving end more quickly, thereby shortening the startup delay. Then transmission is switched to the regular rate.

In addition, a variable bit rate transcoder is optionally used for the data of the initial transmission. The transcoder diminishes somewhat the size of these frames, so they can be transmitted faster. This way the start up delay is shortened even more.

Moreover, the fill level of the de-jitter receive buffer may be started at a value lower than a final value. This speeds up the beginning of play out, further shortening the delay time. The fill level of the de-jitter receive buffer is then gradually increased to a desired final value.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices and methods for minimizing the startup delay of streaming media. Various aspects and embodiments of the invention are now described in more detail. The system of the invention can be a server, a client, or a combination of them.

Figure 3:
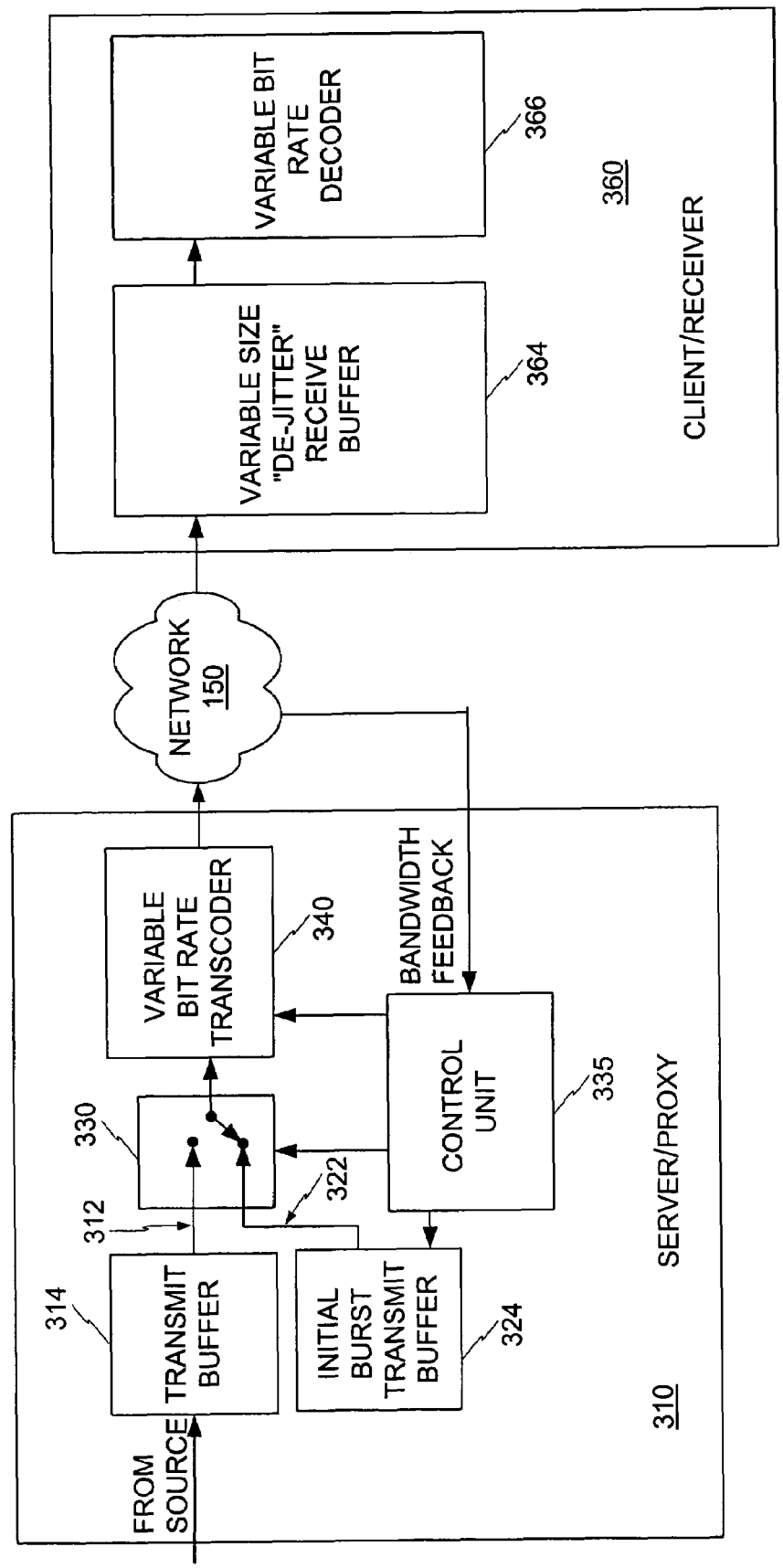
FIG. 3 is a block diagram of a server made according to the invention transmitting data over a network to a client made according to the invention.

Referring to FIG. 3, a device according to the invention is a server 310, which is also known as a proxy 310. As shown, the server 310 can be either a full server, or a portion of a server. The server 310 is for transmitting data over a network 150, such as a packet network, to a client 360. The client 360, which is also known as a receiver 360, includes at least one de-jitter buffer.

The server 310 includes a regular path 312 for transmitting to the network 150 data received from a source. Preferably, the transmit buffer 314 is located in the regular path 312, for buffering data from the source. Transmission through the regular path 312 is intended to be at the regular rate, such as at a fixed frame rate r required by the streaming media in question. The frame rate r may be, for example, 100 frames per second for all audio, or 25 frames per second for video. The streaming media may have a constant or a variable transmission rate.

The server 310 also includes a burst path 322. The burst path 322 is for transmitting data received from the source at a burst rate. The burst rate is higher than the regular rate.

The server 310 most preferably includes an initial burst transmit buffer 324 in the burst path 322. The initial burst transmit buffer 324 is for buffering the data received from the source, above and beyond the operations of transmit buffer 314. The initial burst transmit buffer 324 is also for transmitting the buffer to data through the network 150 to the client 360 at the burst rate.

The server 310 also includes a switch 330. The switch 330 is for selecting to transmit data to the network 150 from either the regular path 312, or the burst path 322. After the switch, the regular path 312 and the burst path 322 are merged.

The server 310 preferably also comprises a control unit 335. The control unit 335 is primarily for controlling the switch 330. The control unit 335 can be implemented as a processor, software in a processor, a separate circuit, etc.

The server 310 preferably also includes a monitor that measures an amount of the data that is output through the burst path 322. That measure is most conveniently a number of frames, the same number as are stored in initial burst transmit buffer 324. This monitor can be implemented in connection with the initial burst transmit buffer 324, such as by software. Alternately, this monitor can be implemented in connection with the control unit 335. The control unit 335 switches the switch 330, when a preset measure of the data is output through the burst path 322.

The server 310 moreover includes a bandwidth monitor that can measure the bandwidth of the network 150. This feature can be optionally implemented in conjunction with control unit 335. This feature is used to provide an estimate of how fast data is being received at the client 360.

Additionally, the server 310 can include a fill level controller that controls the fill level of the initial burst transmit buffer 324. The fill level can be controlled according to the monitored bandwidth.

The server 310 preferably also comprises a transcoder 340. The transcoder 340 is made as is known in the art, and is for transcoding the buffered streaming media that this output through the burst path 322. The transcoder 340 could well be placed exclusively in the burst path 322. It is preferred, however, to place the transcoder 340 where the regular path 312 and the burst path 322 are merged. This way, the transcoder 340 can be additionally used for transcoding the subsequent regular transmission, if it is so desired. Optionally and preferably, the transcoder 340 transcodes the data of the initial burst transmit buffer 324, if the monitored bandwidth of the network 150 becomes less than a preset bandwidth.

A client 360 according to the invention receives streaming media from the network 150. In other words, the client 360 receives the data that encodes the streaming media. The client 360 can be any device that receives streaming media from a network, such as a network appliance.

The client 360 has a receive de-jitter buffer 364 for receiving the streaming media. In addition, it includes a variable bit rate decoder 366. It is preferred that the receive de-jitter buffer 364 has a changing fill level. It is preferred that the fill level is increased gradually, as is described later. It should be noted, however, that the server 310 of invention does not need the client 360 to have a variable size de-jitter buffer.

Figure 4:
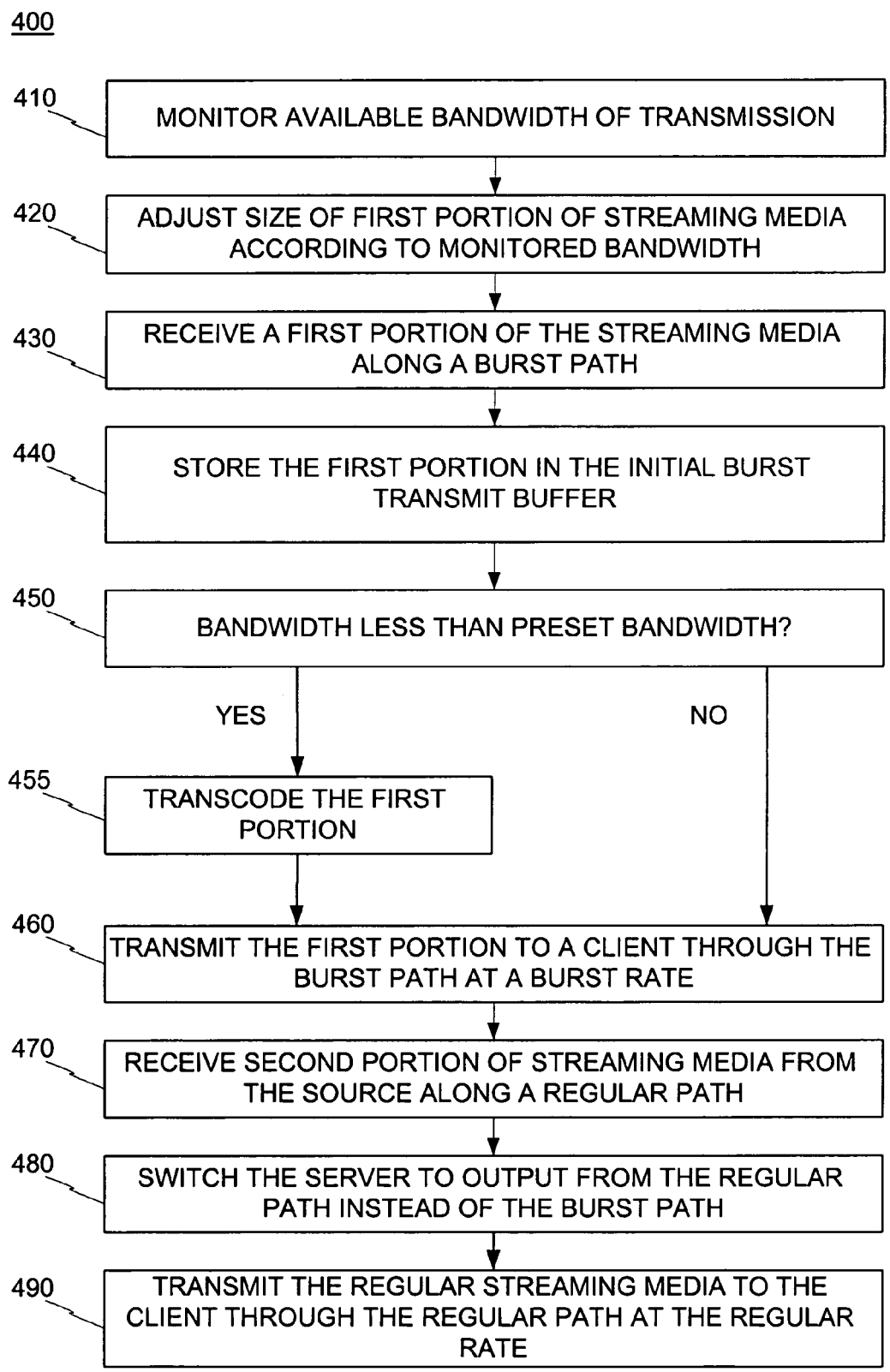
FIG. 4 is a flowchart illustrating a first method according to the invention.

Referring to FIG. 4, a method of the invention is described with reference to flowchart 400. The method is for a server to retransmit streaming media to a network. The streaming media is encoded in data, and ultimately destined for a client.

According to an optional box 410, the available bandwidth of transmission is monitored. This can be accomplished by monitoring the available bandwidth of the network.

According to an optional box 420, a size is adjusted of a first portion of streaming media. This size can be the number of frames that are to be stored in an initial transmit buffer, such as buffer 324.

According to a box 430, a first portion of the streaming media is received along a burst path of the server. The size of the first portion may have been adjusted as per the above. Preferably, the first portion is continuously updated, such as for live media.

According to an optional box 440, the streaming media received along the burst path is stored in an initial burst transmit buffer, such as buffer 324.

According to an optional box 450, it is inquired whether the monitored bandwidth is less than a preset bandwidth. If it is, then according to box 455, the first portion of the streaming media is transcoded. It can be transcoded as it is being played out.

According to a box 460, the first portion of the streaming media (whether transcoded or not) is transmitted to the network through the burst path at the burst rate. The burst rate is as high as permitted by the bandwidth of the connection.

According to a box 470, a second portion of the streaming media is received from the source. The second portion is received along a regular path of the server, which is distinct from the burst path at least in part.

According to a box 480, the server is switched to output data from the regular path, instead of the burst path.

According to a box 490, the second portion is transmitted to the network through the regular path. It is transmitted at a regular rate, which is lower than the burst rate. The regular rate is intended to be the normal frame rate of the streaming media.

Figure 5:
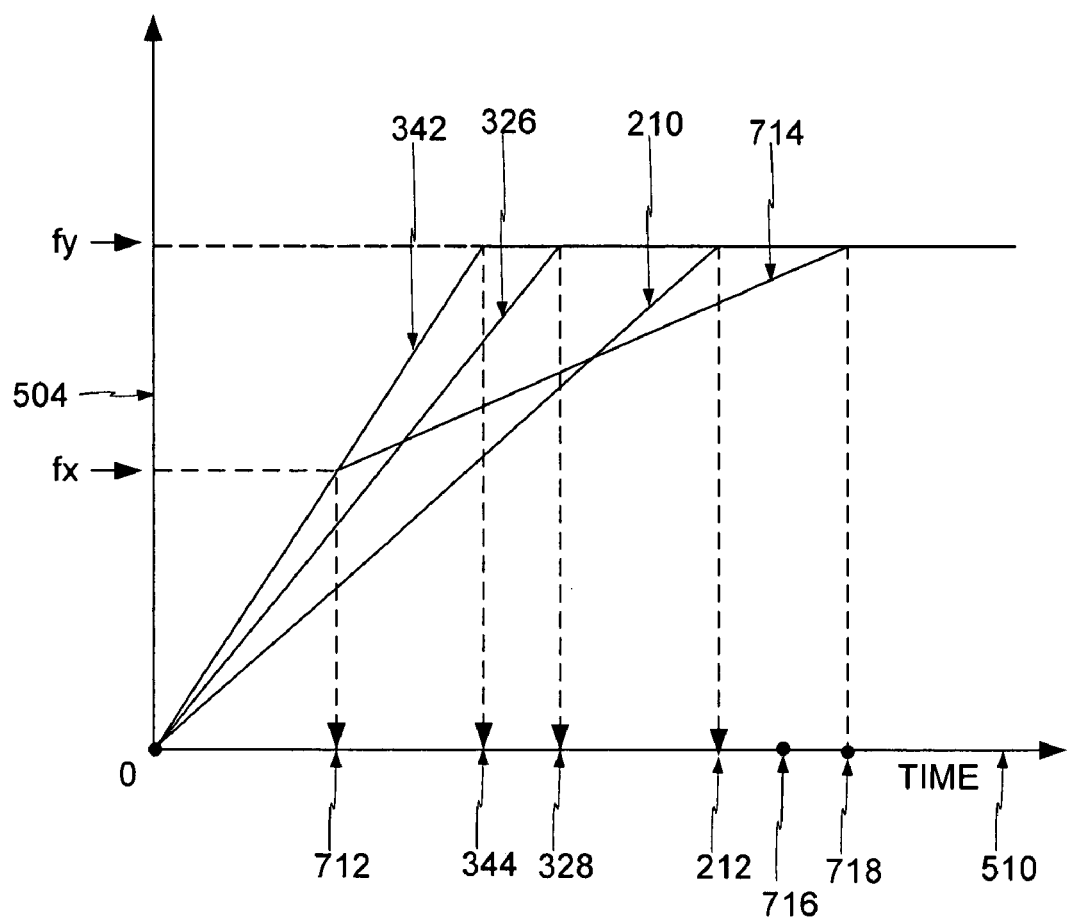
FIG. 5 is a time diagram comparing the improved startup delays accomplished by various embodiments of the invention to the startup delay of FIG. 2.

Advantages of the invention can be now appreciated with reference to FIG. 5. The fullness of the buffer 364 is plotted in a vertical axis 504, against a time axis 510. FIG. 5 is not necessarily to scale.

Figure 1:
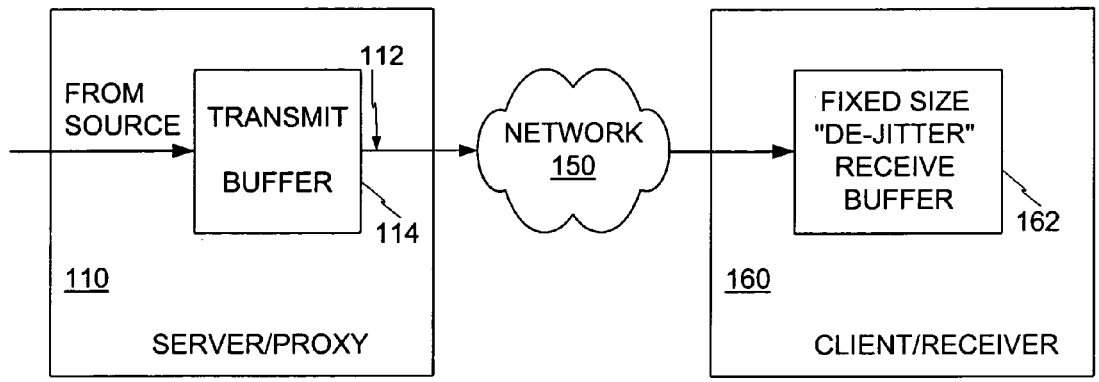
FIG. 1 is a block diagram of a server transmitting data to a client over a network.
Figure 2:
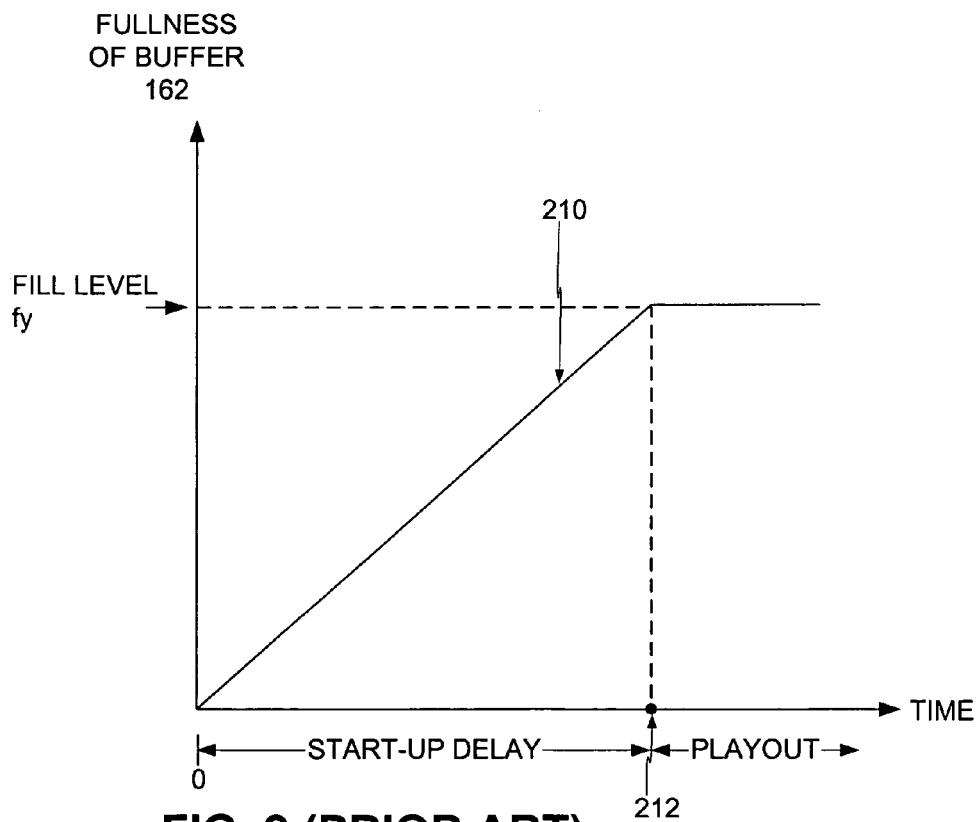
FIG. 2 is a time diagram that demonstrates why the phenomenon of a startup delay occurs in the arrangement of FIG. 1.

The performance of the prior art systems, which was explained in detail with reference to FIG. 2, is presented again in FIG. 5. That was line 210, which gave a start-up time at time point 212.

The initial burst transmit buffer 324 transmits faster than the regular rate of line 210. The resulting performance is given by line 326, which has a higher rate of ascent, because it is using the full bandwidth of the network 150. Line 326 levels out after the buffer 364 reaches its full level fy. This happens at time point 328, at which play out is triggered. This occurs earlier than time point 212, which corresponds to a shortening of the start-up delay. Again, line 326 is straight only ideally.

Moreover, transcoding the first portion further accelerates how fast the buffer 364 reaches its nominal fullness level fy. That is because the fullness is measured in terms of frames, and the transcoded first portion includes less data per frame. This additional feature is depicted by line 342, which has an even higher rate of ascent than line 326. Accordingly, line 342 reaches the fullness level fy at time point 344, which is even earlier than time point 328, thus further shortening the start-up delay. When this feature is implemented, it is true that the first few frames are of a lower quality, because of the transcoding. This does not matter that much, however, because that is also the time that the end user is getting used to the new stream of information.

Figure 6:
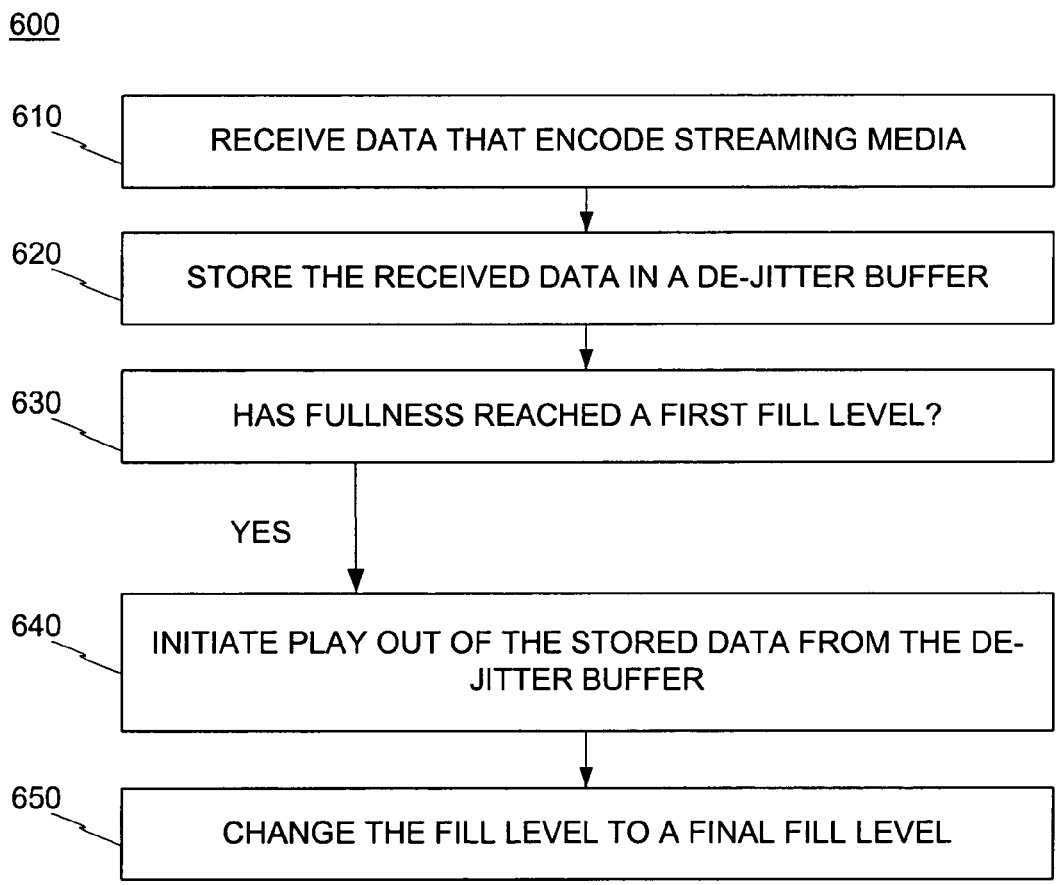
FIG. 6 is a flowchart illustrating a second method according to the invention.

Referring now to FIG. 6, a second method of invention is described with reference to flowchart 600. The second method is for client to receive streaming media over a network.

According to a box 610, the client receives data that encode the streaming media from the network.

According to a box 620, the received data is stored in a de-jitter buffer. This increases a fullness of the buffer.

According to a box 630, it is inquired whether the fullness has reached a first fill level. If it has, then according to a box 640, play out of the stored data is initiated.

According to a box 650, the fill level of the de-jitter buffer is changed while playing out the stored data. Preferably, it is increased gradually up to a final fill level. In other words, play out is initiated before the fullness has reached the final fill level.

Figure 7:
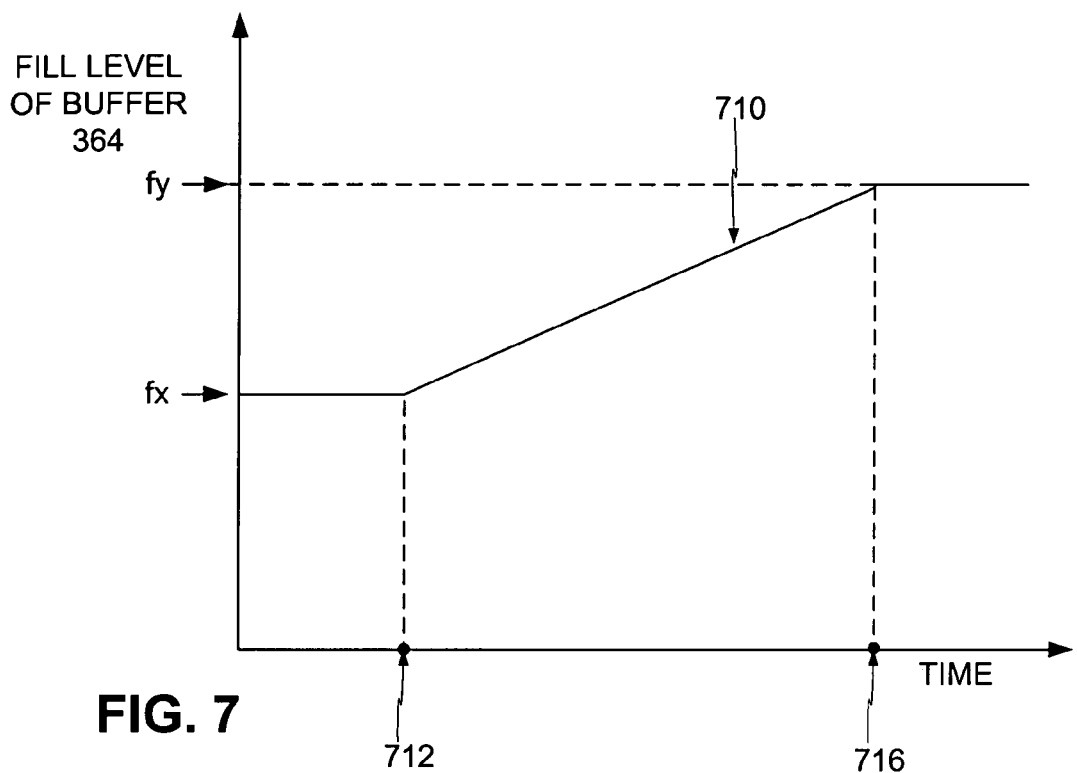
FIG. 7 is a time diagram illustrating the changing fill level of a de-jitter buffer according to the invention.

Referring to FIG. 7, the fill level of buffer 364 is plotted against time by line 710. Up until time point 712, the fill level equals fx. The fill level, or buffer size, of buffer 364 is gradually increased, preferably linearly. It reaches a final fill level fy at time point 716.

The advantage of changing gradually the fill level of the de-jitter buffer will be appreciated by referring back to FIG. 5. Assuming that both the initial burst transmit buffer 324 and transcoder 340 are enabled, the fullness of buffer 364 will be given by line 714. This starts identically from the origin 0, until he teaches a level fx at time point 712. This initiates play out, at the time even earlier than time point 344. This corresponds to the yet fastest start-up delay of all the contrasted schemes.

After time point 712, as the fill level is increased, so is the fullness level. As seen before, the fill level will reach level fy at time point 716. The fullness would also reach fy, at a time point 718. In general, time point 718 occurs later than time point 716.

It should be noted that both time points 716 and 718 occur after time point 212, but that does not matter. The play out has been initiated at time point 712, which shortens the start-up delay.

It should be further noted that the fill level fx started increasing at time point 712, i.e. when the initial fill level fx was reached. That is not necessary, however. The fill level of buffer 364 can start increasing to its final level before or after time point 712.

The invention offers its highest advantage when a high bandwidth is available for the initial, burst transmission. This is now quantified for the various embodiments discussed above.

Figure 8:
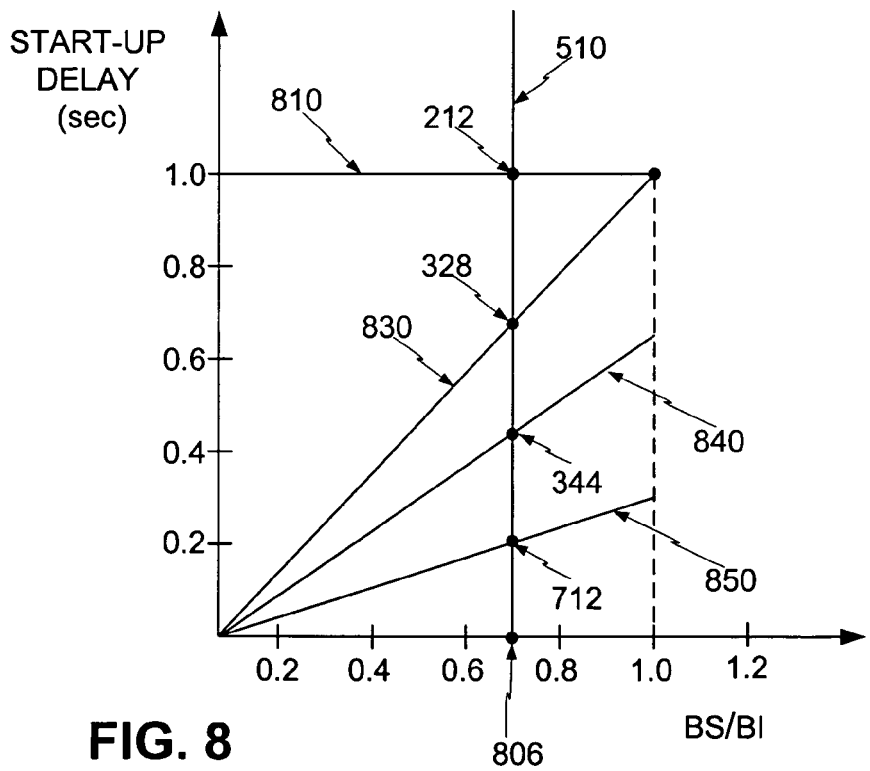
FIG. 8 is a diagram illustrating how the improved start up delays afforded by the present invention depend on a ratio of a demanded bandwidth over the available network transmission bandwidth.

Referring now to FIG. 8, the start-up delay is plotted against a ratio of BS/BI. BS is the transmission rate required by the streaming media. BI is the actually available bandwidth. For values larger than 1, no sustained streaming media transmission is meaningful.

The start-up delay of the prior art is given by line 810. Line 810 corresponds to the performance of the prior art system, discussed above with reference to FIG. 2. In other words, the start-up delay is the same, regardless of how much available bandwidth BI there is over the required bandwidth BS.

Once the ratio of BS/BI is known, a ratio point 806 is chosen on the ratio axis. Then a vertical line 510 is drawn from ratio point 806. It should be noted that this line 510 is also the horizontal line 510 in the diagram of FIG. 5. Accordingly, where line 810 intersects line 510, time point 212 is defined.

If only the initial burst transmit buffer 324 is implemented, the behavior of the system is characterized by line 830. Line 830 intersects line 510 at time point 328.

If also the transcoder 340 transcodes the data stored in buffer 324, then the behavior of the system is characterized by line 840. Line 840 intersects line 510 at time point 344.

If, in addition to the above, the buffer fill level is increased gradually from fx to fy, then the behavior of the system is characterized by line 850. Line 850 intersects line 510 at time point 712.

As can be seen from the vertical axis of FIG. 8, the start-up delay becomes smaller, as more and more features of the invention are implemented. In addition, as more bandwidth is available, the line 510 shifts closer to the left. Then the time points 712, 344, and 328 slide down accordingly, corresponding to a diminishing startup delay. In other words, the more bandwidth becomes available, the better the invention works in minimizing the start-up delay.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as patentable. Additional claims for other combinations and subcombinations of features, functions, elements and/or properties may be presented in this or a related document.

The invention claimed is:

1. A server for transmitting data over a network to a client having a de-jitter buffer, the server comprising:
   a regular path for transmitting data received from a source at a regular rate;
   a first buffer in the regular path for buffering data from the source prior to transmission to the client;
   a burst path for transmitting data received from the source at a burst rate higher than the regular rate before playout at the client distinct from the regular path at least in part;
   a second buffer in the burst path for buffering data from the source prior to transmission to the client, and for transmitting the buffered data to the client at the burst rate before playout at the client; and
   a switch for selecting to transmit data from one of the regular path and the burst path.

2. The server of claim 1, further comprising:
   a control unit for switching the switch.

3. The server of claim 2, further comprising:
   a monitor that measures an amount of the data is output through the burst path, and
      wherein the control unit switches the switch when a preset measure of the data is output through the burst path.

4. The server of claim 1, further comprising:
   a network bandwidth monitor; and
   a controller that controls a fill level of the second buffer according to the monitored bandwidth.

5. The server of claim 1, further comprising:
   a transcoder for transcoding the buffered streaming media output through the burst path.

6. The server of claim 1, further comprising:
   a network bandwidth monitor; and
   a transcoder for transcoding the buffered streaming media output through the burst path if the monitored bandwidth becomes less than a preset bandwidth.

7. The server of claim 1, the regular path for transmitting data received from the source over the network at the regular rate.

8. A server for retransmitting streaming media comprising:
   means for receiving a first portion of the streaming media from a source along a first path;
   means for buffering the first portion prior to transmission to a client and outputting the buffered first portion to the client on the network through the first path at a first rate before playout at the client;
   means for receiving a second portion of the streaming media from the source prior to transmission to the client along a second path distinct from the first path at least in part; and
   means for transmitting the second portion to the client on the network through the second path at a second rate lower than the first rate.

9. The server of claim 8, further comprising:
   means for switching to outputting from the second path, from outputting from the first path.

10. The server of claim 8, further comprising:
    means for storing the first portion.

11. The server of claim 8, further comprising:
    means for monitoring a bandwidth of the network; and
    means for controlling a size of the first portion according to the monitored bandwidth.

12. The server of claim 8, further comprising:
    means for transcoding the first portion.

13. The server of claim 8, further comprising:
    means for monitoring a bandwidth of the network; and
    means for transcoding the first portion if the monitored bandwidth becomes less than a preset bandwidth.

14. A method for a server to retransmit streaming media comprising:
    receiving a first portion of the streaming media from a source along a first path of the server;
    buffering the first portion prior to transmission to a client and outputting the buffered first portion to the client on the network through the first path at a first rate before playout at the client;
    receiving a second portion of the streaming media from the source prior to transmission to the client along a second path of the server distinct from the first path at least in part; and
    transmitting the second portion to the client on the network through the second path at a second rate lower than the first rate.

15. The method of claim 14, further comprising:
    switching the server to outputting from the second path, from outputting from the first path.

16. The method of claim 14, further comprising:
    storing the first portion in an initial burst transmit buffer.

17. The method of claim 14, further comprising:
    monitoring a bandwidth of the network; and
    controlling a size of the first portion according to the monitored bandwidth.

18. The method of claim 14, further comprising:
    transcoding the first portion.

19. The method of claim 14, further comprising:
    monitoring a bandwidth of the network; and
    transcoding the first portion if the monitored bandwidth becomes less than a preset bandwidth.

* * * * *